INVENTOR.
Joseph Szydlowski,

Oct. 21, 1958  J. SZYDLOWSKI  2,856,755
COMBUSTION CHAMBER WITH DIVERSE COMBUSTION AND DILUENT AIR PATHS
Filed Oct. 19, 1953  6 Sheets-Sheet 3

INVENTOR.
Joseph Szydlowski,

INVENTOR.
Joseph Szydlowski,

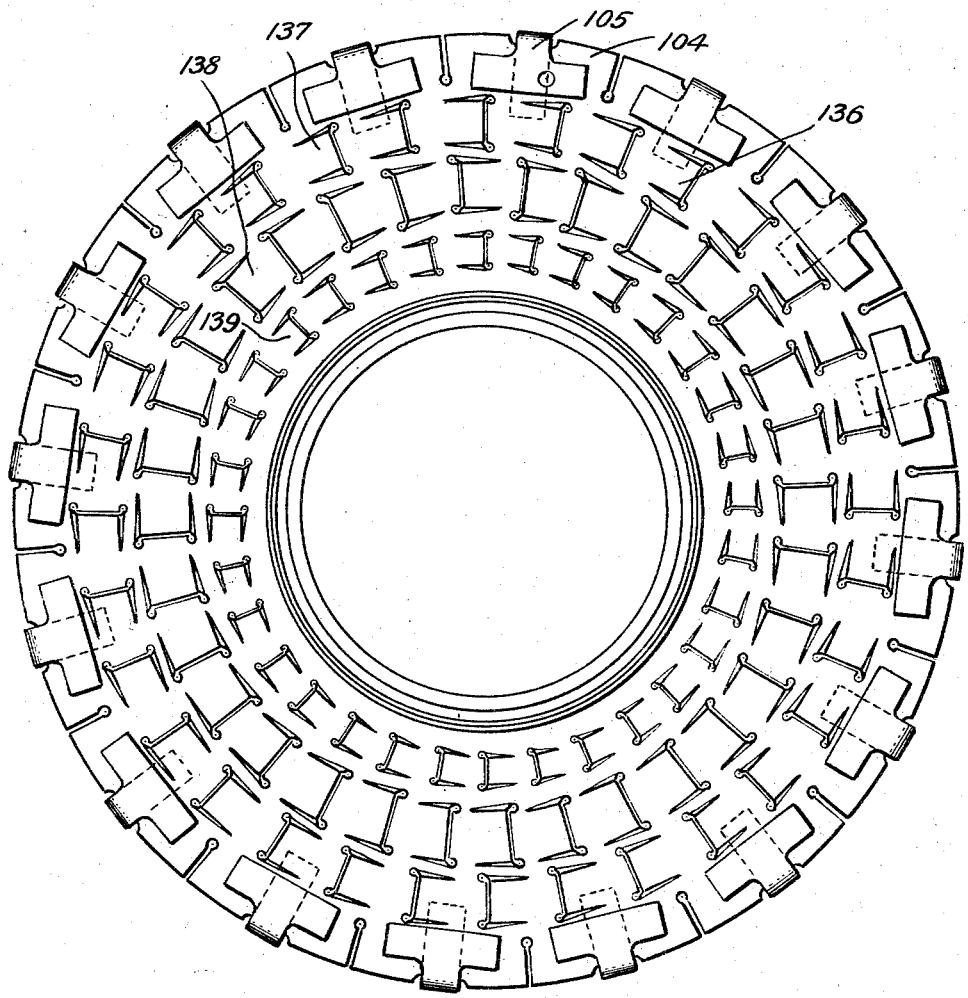

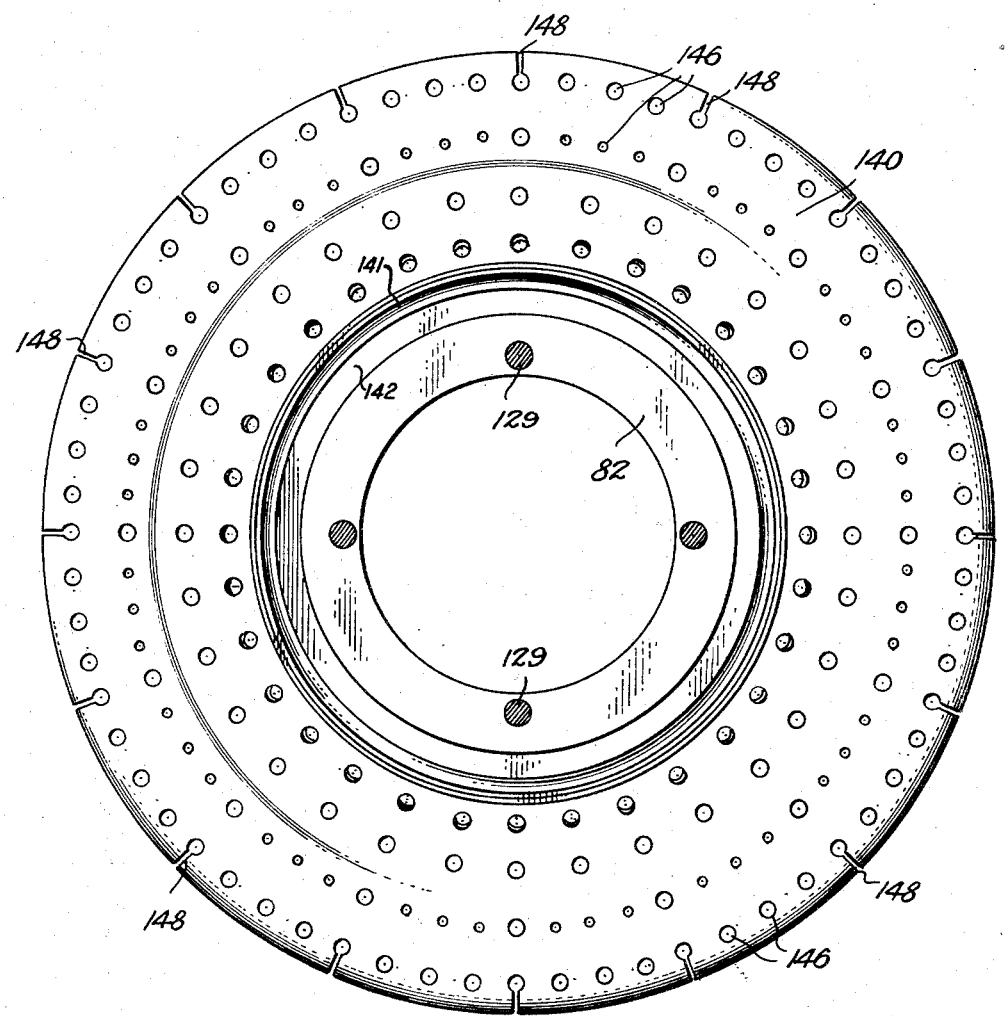

United States Patent Office 2,856,755
Patented Oct. 21, 1958

2,856,755
COMBUSTION CHAMBER WITH DIVERSE COMBUSTION AND DILUENT AIR PATHS

Joseph Szydlowski, Usine Turbomeca, Bordes, France

Application October 19, 1953, Serial No. 386,762

25 Claims. (Cl. 60—39.36)

This application is a continuation-in-part of application Serial No. 126,141 filed November 8, 1949, now abandoned.

The invention relates to a combustion chamber particularly designed for feeding combustion gases to a gas turbine or a reaction jet nozzle.

An object of the invention is to provide an annular combustion chamber of toroidal configuration having a radially arranged ignition zone and an axially extending ejection zone with the combustion chamber completely surrounding a rotary fuel distributing shaft which provides a mechanical connection between the turbine and an impeller type air compressor.

A further object of the invention is to provide a compact and streamlined structure with a combination chamber adapted to expand freely both axially and radially.

A further object is to provide a chamber which is formed of three main wall sections or portions defined by annular surfaces shaped preferably through stamping and such sections are held fast at only one of their edges while the ends that are not held fast slide freely over expansion bearings. The constitution of the chamber in three annular wall portions allows an easy dismantling that makes access into it and its cleaning an easy matter and this also allows a rapid replacement of any damaged element.

A further object of the invention consists in providing a combustion chamber with feeding means for a compressed combustive fluid, such as air, which means is subdivided before combustion and mixture with diluting air into three main streams:

First, a primary flux that flows in sheet formation in the vicinity of and over the front wall of the chamber and also in the vicinity of the revolvable shaft arranged axially of the chamber.

Second, an auxiliary stream flowing in proximity to and outside of the front wall of the chamber and inside the central portion thereof, and Third, a flow incorporated in the mixture feeding the turbine or the reaction jet nozzle opening into the chamber substantially in register with the air input fed by the compressor delivering the combustive air or the like fluid.

A still further object of the invention consists in providing a combustion chamber wherein the diffuser of the burnt gases at the output end of the chamber is subjected to a strong cooling action.

According to another object of the invention, the combustion chamber is reliably protected against any clogging of the fuel pipes. To this end, the rotary shaft is of hollow construction and the fuel is introduced into the chamber through jets rotating with the shaft and delivering the fuel from conduits provided in the hollow shaft into the combustion chamber. The diameter of the apertures or jets is selected so as to have a value considerably above that required for the output necessary and it is independent of the output since the adjustment of the output is executed before the fuel enters the hollow shaft, as described in my copending application Serial No. 126,144 filed November 8, 1949 now abandoned and entitled Feeding of Fuel to Gas Turbines.

A still further object of the invention consists in providing a combustion chamber that is not affected by the direction of flow of the air delivered by the air compressor, that allows a very large field of adjustment and wherein the amount of air is always sufficient for ensuring a complete combustion before the entrance of the gases into the exhaust gases diffuser.

A further object of the invention consists in providing a combustion chamber wherein the efficiency of combustion is very high and variations in the operating conditions such as power changes or running speed changes are made easier. To this end, the cross sections provided for the passage of the primary air are designed so that the primary air may arrive into the vicinity of the flame at a low speed so as to provide for the permanency of a very hot core at the beginning of the combustion.

Further object is to provide a construction wherein the pressure at the point of injection depends on the centrifugal force exerted by the speed of rotation of the slinger shaft and consequently the operation is performed with excellent automaticity and since the time during which the burning fluid remains in the chamber is very short very heavily loaded chambers that are comparatively short may be constructed.

A further object of the invention is to protect the various elements by means of air streams which reduce the cost of operation and the frequency of repair and also brings about a substantial increase in the efficiency of the combustion because of the preheating of the air admitted into the combustion chamber.

A further object of the invention is to provide tangential ports in the front wall of the combustion chamber which are preset as to the area thereof and are spaced radially in said front wall so as to control the temperature of the exhaust gases and make them substantially uniform throughout the exhaust gas outlet.

A further object of the invention is to construct the front inner wall of the combustion chamber so as to be concave or dish shaped towards the combustion space with radially spaced holes therein each normal to the surface thereof so as to direct the streams of air through said holes in a converging direction into the combustion space.

A still further object of the invention is to provide a stream of air flowing axially at first, then curving in a loop inwardly and radially, then flowing axially in a reverse direction to said first direction towards the front of the inner wall of said combustion chamber, then making a continuing loop through the combustion chamber through the burning mixture and then continuing in a direction substantially parallel to the initial flow of air to the outlet portion of said chamber. The flow of air in its radial inward passage crosses the path of the last named flow of burning mixture.

A further object of the invention is to provide a cooling of the exhaust gases at a point of the outlet which is closely adjacent the annular combustion chamber by means of cooling tubes having their outlets located substantially medially of the inner and outer annular walls of the outlet portion.

A still further object of the invention is to provide an igniter which is located in front of the ports provided in the front of the combustion chamber so as to ignite and shoot a flame through such ports in order to ignite the combustible mixture in the combustion chamber.

With the above and other objects in view which will become apparent from the detailed description below of several preferred embodiments of the invention, the invention is illustrated in the drawings in which:

Fig. 3 is a perspective view of the hollow diffuser for the combustion gases at the outlet from the combustion chamber.

Fig. 4 is a cross-sectional view taken upon section line IV—IV of Fig. 2.

Fig. 7 is an elevational view of the front wall of the combustion chamber illustrating the tangential ports, and Fig. 8 is an elevational view of the rear concave wall of the combustion chamber of Figures 5 and 6.

In the various figures of the drawings similar reference characters are used to indicate like parts.

Figure 1:
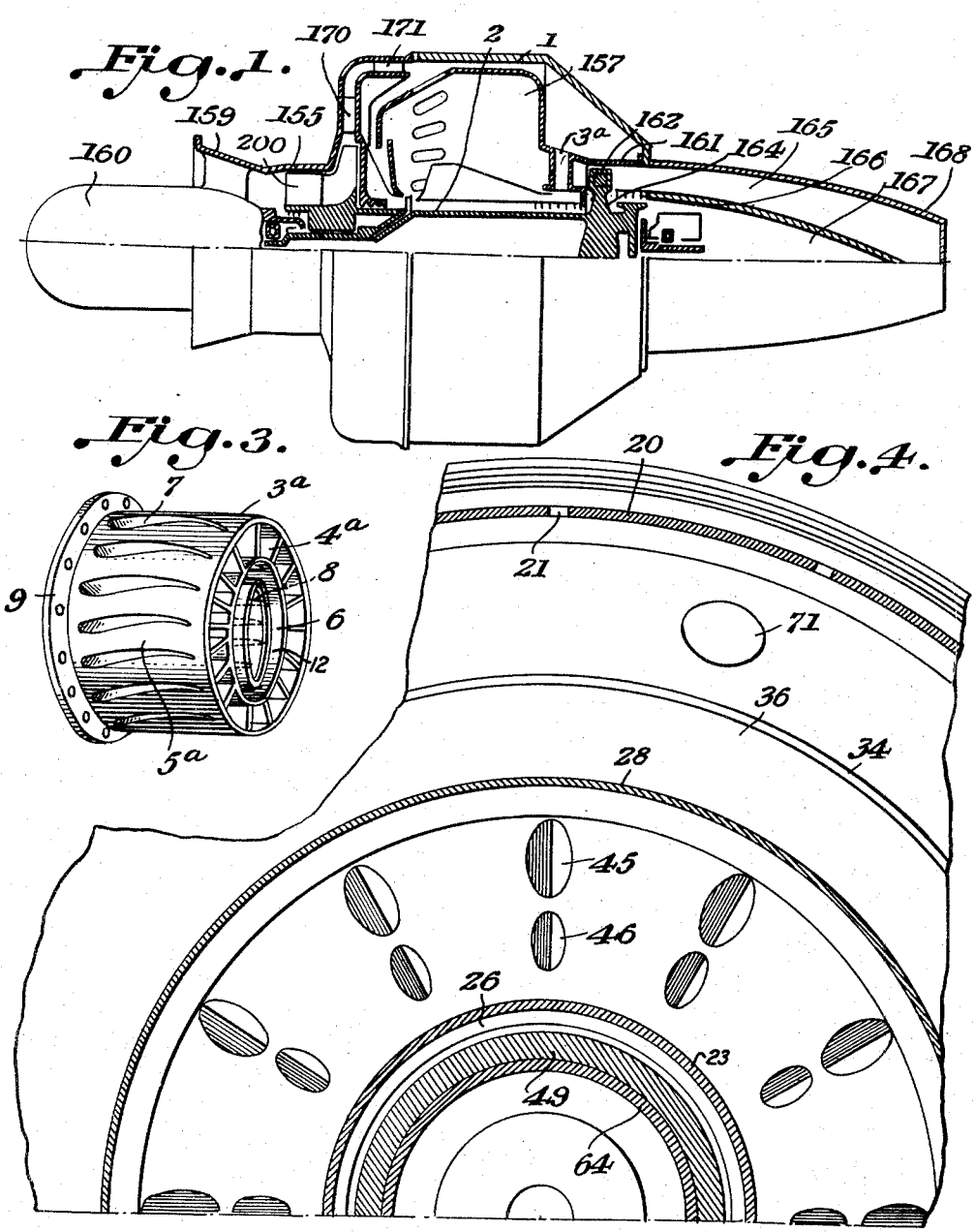
Fig. 1 shows diagrammatically an internal combustion turbine plant incorporating a combustion chamber according to the invention.

The reaction jet turbine shown in Fig. 1 includes a compressor casing 155 containing an impeller type air compressor for feeding compressed air. The compressor casing is associated with a casing 1 for the combustion chamber 157. The combustion chamber includes a hollow diffuser 3a for the burnt gases. The axial input end for the compressor casing 155 is provided with an axial input nozzle 159 along the axis of which is arranged a streamlined casing 160 containing the various auxiliary elements such as a starter, a fuel pump, an oil pump and a regulator for the fuel delivery.

The turbine casing 161 is connected with the combustion chamber casing 1 and with the diffuser 3a. Only one turbine wheel 162 is shown fixed to the hollow central shaft 2. The rear terminal surface 164 of the turbine wheel faces the gaseous output stream 165, the fluidtight means mounted towards the rear being constituted by a bearing and a labyrinthic system 166 forming a thrust member setting in opposition to the thrust of the gases on the blades of the single turbine wheel. The gaseous stream 165 flows between a central streamlined needle or core 167 and an outer wall 168 also streamlined in the usual manner provided in reaction jet turbines of the same type. The group thus illustrated is of the type described in my copending application Serial No. 126,143 filed November 8, 1949, now abandoned entitled "Coaxial Combustion Products Generator and Turbine."

Figure 2:
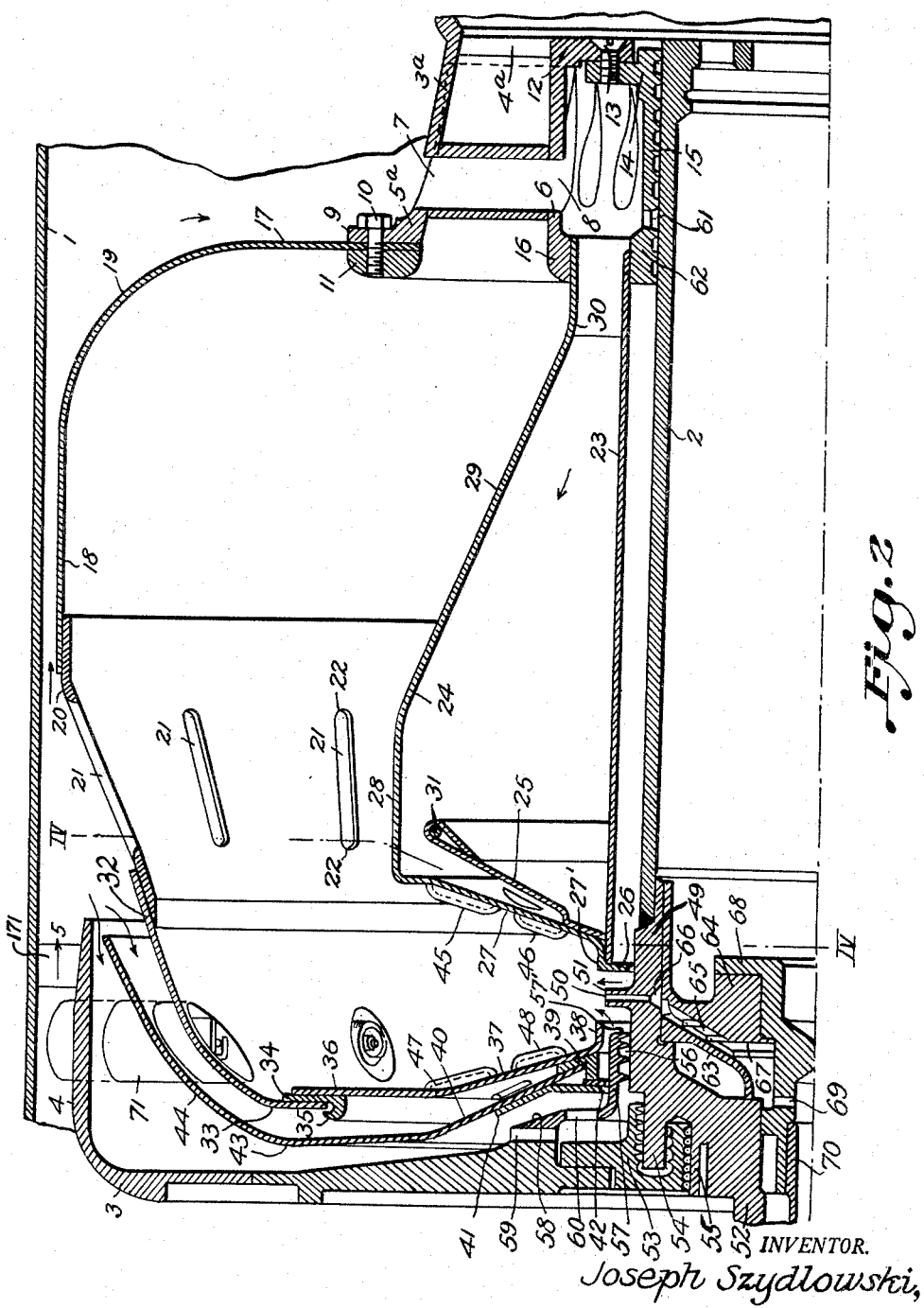
Fig. 2 shows on a larger scale a half section of an annular combustion chamber.

The combustion chamber illustrated in Fig. 2 is mounted inside the casing 1 and surrounds the rotary shaft 2.

A drum shaped flange 3 is located within the casing 1 and its rearwardly directed flange 4 defines an annular passage 5 between it and the inner surface of the casing 1. The annular passage is provided with guiding blades such as diffusers 170 and 171 shown in Fig. 1 forming the input for the compressed air or the like combustive reagent delivered by the compressor 200 within the compressor casing 155.

The diffuser 3a is also fixed to the casing 1 and this diffuser has blades 4a that are regularly distributed around the axis of the chamber and such blades 4a are hollow as shown particularly in Fig. 3.

The blades 4a are held between the two cylindrical coaxial walls 5a and 6, that are fixed to the casing 1. The hollow blades 4a define channels for the passage therethrough of the compressed air as provided through openings 7 cut in the cylindrical surface 5a and corresponding openings 8 cut in the inner wall 6. The inlet of the outer wall of the hollow diffuser 3a is provided with an outer flange 9 that is secured by screws 10 to the annular combustion wall 17 by means of a clamping ring 11.

The outlet end of the inner wall 6 is also provided with a flange 12 that is bolted by screws 13 to the shoulder or flange 14 on a labyrinthic sleeve 15. The wall 6 is provided at its end opposed to the flange 12 with a reinforcement or collar having a sliding contact surface 16 coaxial with the chamber. Between the flange 9 and the ring 11 is clamped an annular wall 17 merging into an open cylinder coaxial with the chamber and the side wall member 18 of which, parallel with the axis of revolution of the whole arrangement, is connected through the arcuate wall 19 to the wall 17. The edge of the wall member 18 is fixed through welding or otherwise to a ring 20 assuming substantially the shape of a truncated cone and the periphery of which is provided with a number of longitudinal ports 21. The ports 21 are regularly distributed over the surface of said truncated cone and are of elongated shape. They are drawn substantially in parallelism with the generating lines of the truncated cone. The ports 21 are provided with rounded ends as illustrated at 22. The slope of the generating lines of the truncated cone constituted by the ring 20 is such that said generating lines cut, along a predetermined angular direction, the output direction of the air streamlets entering the casing 1 through the annular passage 5.

The front end of the labyrinthic sleeve 15 is fixed to one end of a tubular member 23 extending in parallelism with and coaxially around the wall of the hollow shaft 2. The other end of the member 23 is fixed through welding or otherwise with the inner wall 24 of the combustion chamber and with a deflecting ring or baffle plate 25.

The wall 24 is provided with a radially bent perforated flange 26 leaving a slight clearance between its inner periphery and an extension of the surface of the shaft 2 and the flange 26 is connected rigidly with a truncated cone wall section 27. The flange 26 and wall section 27 are connected by a cylindrical edge 27'. The truncated cone wall section 27 that is coaxial with the shaft 2 is connected through a rounded surface with a further cylindrical wall section 28 that is located substantially in register with the ports 21. A slightly rounded part provides for the connection between the wall section 28 and a second truncated cone section 29 ending in the form of a tubular section 30 engaging slidingly the surface 16. The wall 24 of the casing includes therefore the sections 27 to 30.

The tubular member 23 is fixed, in register with the flange 26, to the baffle plate 25 constituted by two truncated cone elements connected with one another wherein the larger base of the second outer truncated cone is reinforced by a wire 31 enclosed in a fold of the sheet forming the baffle plate 25.

The ring 20 is partly covered by a member 32 along its edge opposed to the one connected with the wall 18 and the member 32 includes a truncated cone wall forming substantially an extension of the ring 20 and connected by a rounded section with a flange 33 provided with a central opening.

Along the periphery of the flange 33 is located a ring 34 provided with an annular hook-shaped centering flange 35. The ring 34 is fixed to a flat surface 36 connected with an inner truncated cone wall section 37 that is substantially symmetrical with reference to the truncated cone wall 27 forming part of the inner wall casing. The wall section 37 is connected through a rounded portion with a short cylindrical edge 38 registering with and spaced from the cylindrical edge 27' connected with the flange 26. The edges 38 and 27' define therebetween a fuel inlet gap of annular shape facing toward the shaft 2. In the vicinity of the line of connection between the elements 37 and 38, there is welded thereto a reinforcing ring 39 fixed to a truncated cone element 40, the generating line of which assumes a greater slope than that of the wall section 37. The element 40 is reinforced by a welded ring 41 that is also a truncated cone and is welded in its turn to a reinforcing ring 42 fixed to the ring 39. The wall 40 extends as an annular wall 43 ending with a rounded part 44 whose edge registers with and is spaced from the edge of the flange 4 on the inside of the volume defined by the revolution of the latter. The whole arrangement disclosed is held fast and centered by the wall of the sump-shaped recesses provided for the spark plugs as described hereinafter.

The truncated cone wall sections 27 and 37 are perforated and the slashes 45—46—47 and 48 of the two series of perforations form fins guiding the air through said slashes. These fins are directed in a direction opposed to the direction of rotation of the shaft 2 (Fig. 4). The shaft 2 rotates inside bearings, not illustrated, of the type described in my copending application Serial No. 126,142 filed November 8, 1949, now abandoned, entitled: "Arrangement for Securing to an Expansible Casing Bearings or the Like Members."

Fluidtightness is ensured on one hand through the labyrinthic sleeve 15 and on the other hand through a further labyrinthic arrangement to be described. The end of the shaft 2 that is adjacent to the inlet of the chamber constituted by the annular gap between the wall edge 38 and the flange 26 is fixed to a perforated ring 49 with openings 50 of a size selected so as to have a value considerably above that required for the necessary output. Ports 51 registering with the openings 50 are provided in the cylindrical reinforcements arranged at equal angular distances over the periphery of the ring 49 along a circle that lies substantially at equal distances from the edges of the inlet of the combustion chamber. The ring 49 forms a terminal reinforcement for a further revoluble shaft 52 and includes fluidtight bearings associated with labyrinthic contact surfaces. A first double labyrinthic sleeve 53 mounted elastically on the drum-shaped casing 3 through securing means of the type described in the above-mentioned copending application Serial No. 126,141, filed November 8, 1949, now abandoned, is fitted over a cylindrical extension 54 of the ring and shaft system 49—52. It is arranged in coaxial relationship therewith and it bears also against a cylindrical wall 55 provided on the inside of the cylindrical extension 54. The ring 49 is also associated with a fluid-tight bearing 56 against which bears with a slight clearance the labyrinthic proportioning member 57. The member 57 has an annular perforated extension 58 bearing against the wall of the casing 3. The perforations therein form two series of channels, namely, the radial channels 59 and the axial channels 60 and these channels open into the space between the bottom of the casing 3 and the wall 40.

The labyrinthic member 15 is provided with a plurality of radial perforations 61 located to the rear of the portion 62 of such member that forms a proportioning means for the passage of compressed combustive reagent, a slight clearance being provided between said part 62 and the outer surface of the shaft 2.

Inside the ring 49 there are located distributing rings 63, 64 between which there is formed an annular truncated conical channel 65 opening into the annular groove 66 connecting together the different openings 50. Inside the channel 65 there is located an element 67 provided with corrugations adapted to hold back the liquid sheet lying in contact with the wall. The liquid fuel is fed between the rings 63, 64 through a mouth piece 68 that is radially perforated by ports 69 which allow the fuel to enter the channel 65 from a hollow shaft 70 fitted inside a terminal bore of the mouth piece 68.

The shaft 2 may be actuated in the usual manner by a turbine fed with the gases coming from the diffuser 3a and the driving power for the compression of the air may be taken off such shaft. In this case the combustion chamber is located between the compressor and the turbine that are interconnected through the shaft that passes through the central portion of the annular combustion chamber.

The operation of the above disclosed apparatus is as follows. The compressor 155 feeds compressed air to the annular passage 5 and the compressed air is thus admitted into register with the ring 20. A fraction of this compressed air passes between the wall member 18 and the wall of the casing 1 surrounding the same after which it passes into the hollow diffuser blades 4a through the ports 7 and thence back between the walls 23 and 24 so as to enter the slashes 45 and 46 provided behind the baffle plate 25 in the wall section 27. Air passes also through the ports 61 into the space underneath the labyrinthic proportioning member 62 wherefrom it flows through the clearance provided between the shaft and the flange 26 into the vicinity of the output of the fuel ports 51. Similarly air passes between the casing 3 and the wall 43 through the ports 59, 60 into a space underneath the labyrinthic member 57 and into the clearance 57' provided inside the reinforcing ring 42 and finally into proximity with the same ports 51. A further stream of air may pass between the walls 44 and 33 and engage the inside of the actual combustion chamber through the distributing perforations 47, 48.

The ports 50 are suitably fed with fuel, as for instance through an arrangement of the type disclosed in my copending application Serial No. 126,144 filed November 8, 1949, now abandoned, and entitled: "Arrangement for Feeding Gas Turbines." The ports 50 rotate at high speed with the shaft and are fed with fuel under delivery conditions that are independent of their cross-section while air is sent into the passage 5 and ignition is secured by means of spark plugs located at the periphery of the chamber and passing through the combustion chamber walls inside sump-shaped recesses 71 holding and centering the front walls.

The air passing between the walls 4 and 44 and between the wall 23 and the tubular member 2 forms primary air streams arriving at a very low speed quite near the point at which the flame is obtained. The flame remains therefore very steady without running any risk of being blown out whatever may be the conditions of operation.

The air passing between the walls 32 and 44, on one hand, and between the walls 23 and 24, on the other hand, form secondary streams of air engaging directly the flame in a direction opposed to the rotation thereof which leads to a complete combustion and cuts out any risk of producing unburnt gases by reason of the violent turbulency thus arising.

The air entering through the ports 21 forms a mass of air increasing the volume of gases passing through the blades of the diffuser 3a to the blades of the turbine 162 downstream of the combustion chamber. The position and angular setting of the ports 21 provide for a circulation of the gases in the chamber and also for a predetermined proportioning of the mixture components. The axial and radial distribution of the air in the mixture is thus ensured under favorable conditions.

All parts liable to be damaged lying in the vicinity of the chamber are protected by a double air stream. The shaft 2 is protected by an air stream located between its outer surface and the coaxial wall 23, on one hand, and, on the other hand, by the air stream located between the wall 23 and the wall 24. Similarly the front of the casing is protected by a double flow of air.

The proper behavior and rigidity of the hollow diffuser blades are ensured through the fact that they are constantly cooled by the air stream passing through them.

The circulation of air around the chamber increases the possibility of using the material forming the chamber system at high temperatures by reason of the methodical cooling produced. Similarly the thermic exchange provided increases the temperature of the primary and secondary air streams, which increases, in its turn, the efficiency of the combustion and allows reducing the amount of fuel required for obtaining a predetermined power.

The mounting of the different elements of the chamber permits their free displacement under the action of the expansions and contractions thereof without any danger of breaking and without disturbing the proper operation of the arrangement.

The wall 17 defining the rear wall of the combustion chamber is secured through the ring 11 alone. The ring 42 is adapted to slide freely over the labyrinthic member 57. The radial expansion or contraction of the wall 44 and ring 20 is thus completely free.

The movements of the inner wall of the chamber are also axially and radially free by reason of the tubular member 23 being secured to the labyrinthic member 15 while the element 30 surrounding the element 23 may slide freely over the surface 16.

A modified construction is shown in Figs. 5 to 8 inclusive. In this modification the compressor casing 72 contains the impeller type air compressor 73 which feeds the compressed air into the combustion chamber 74. A hollow bladed diffuser 75 is provided at the outlet of the combustion chamber for the combustion products.

The axial annular input nozzle for the compressor 73 is indicated at 76 and the casing wherein the various auxiliary elements such as a starter, fuel pump, oil pump and regulator for the fuel delivery is shown at 77.

Figure 5:
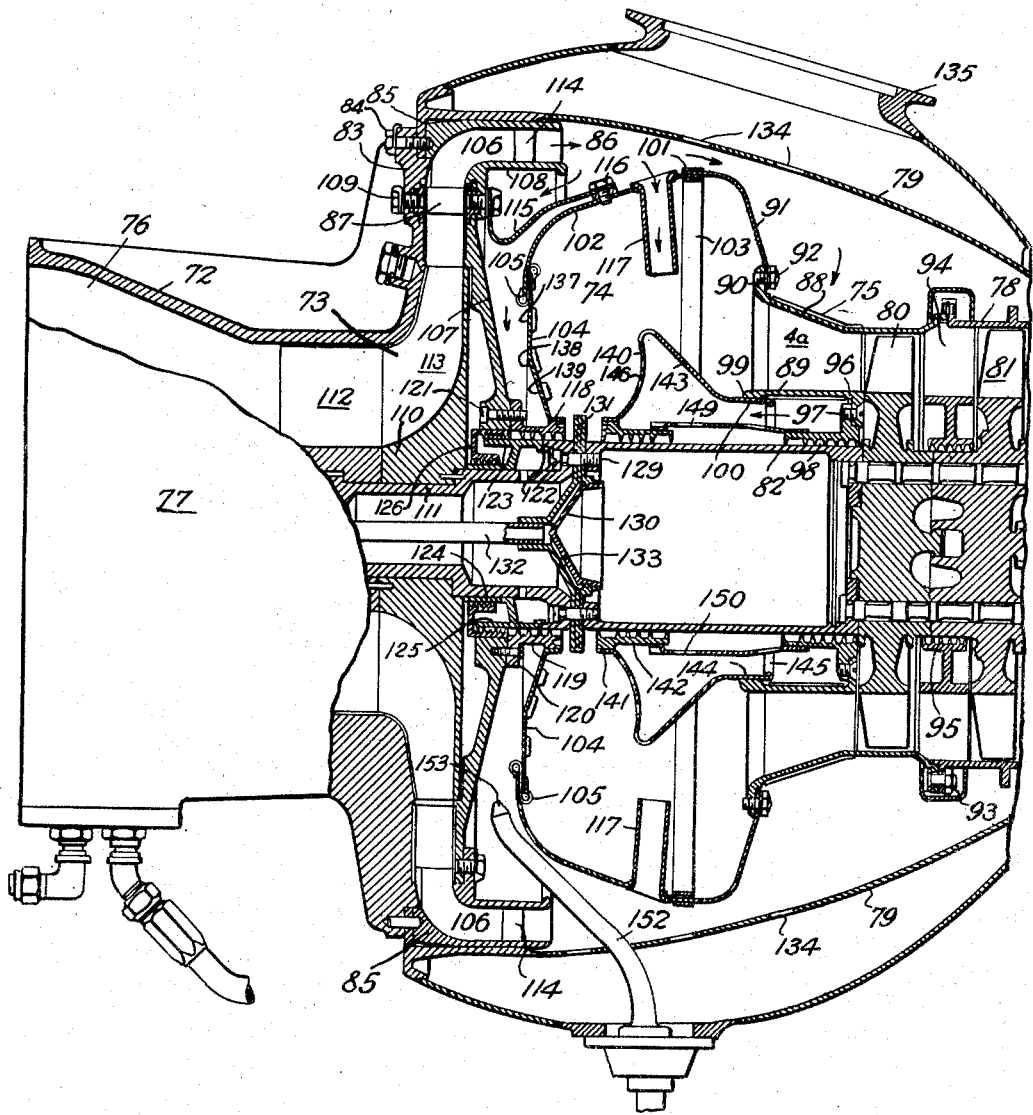
Fig. 5 is a partial cross-sectional view of a modified construction of the combustion chamber and associated parts.

The turbine casing 78 is connected with the combustion chamber casing 79 at a point to the right of the showing in Fig. 5 similar to the connection between the turbine casing 161 in the first described modification and the combustion chamber 1. The turbine casing 78 is also connected to the hollow bladed diffuser 75. Turbine wheels 80 and 81 are fixed to the hollow central shaft 82. The rear terminal surfaces of the turbine wheels 80 and 81 face the gaseous output stream in the same manner as shown at 165 in Fig. 1 and fluidtight means, not shown, are mounted towards the rear forming a bearing and a labyrinthic system which constitute a thrust member in opposition to the thrust of the gases on the blades of the turbine wheels.

Figure 6:
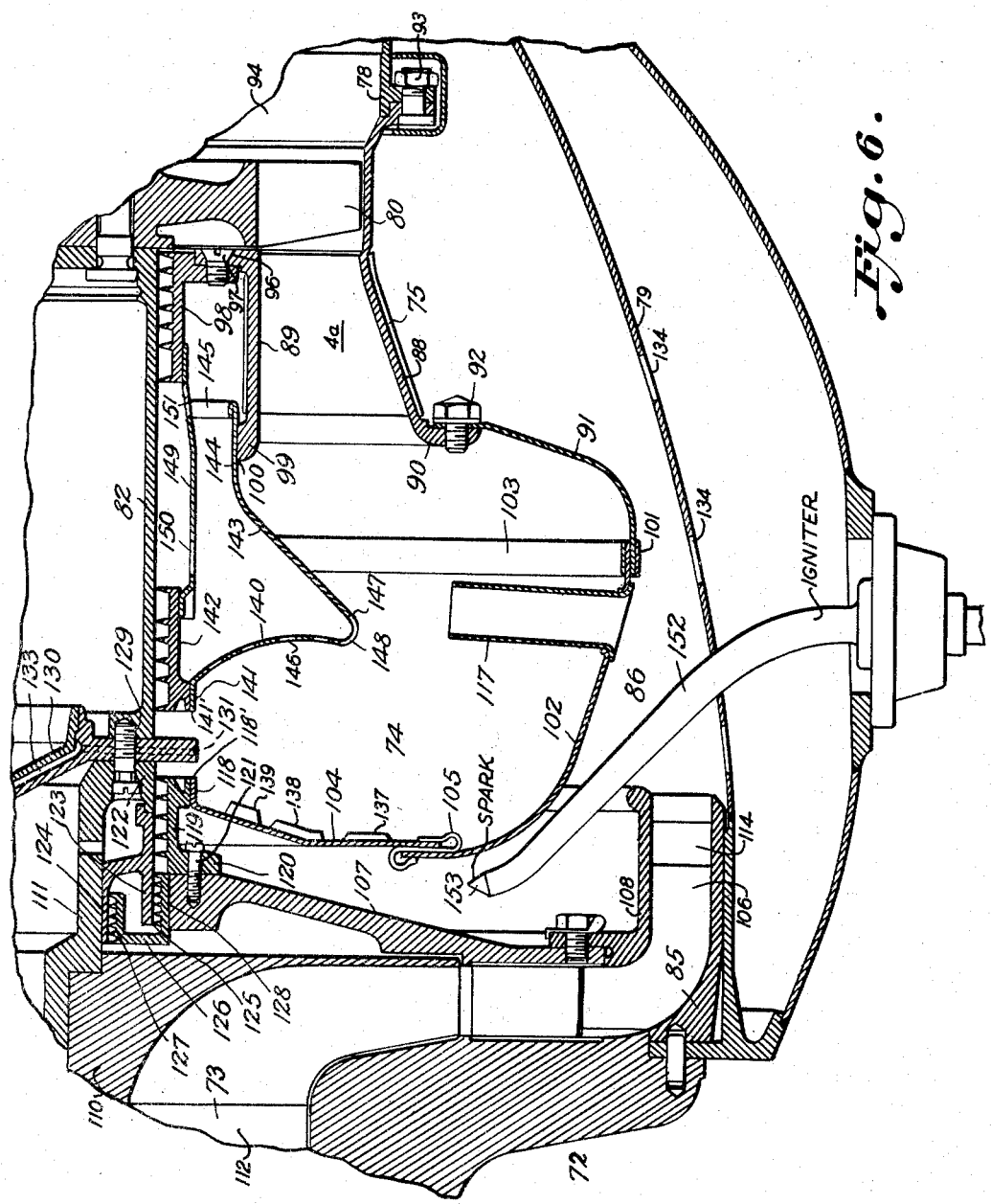
Fig. 6 is an enlarged half sectional view of the combustion chamber shown in Fig. 5.

The combustion chamber shown in Fig. 5 in sectional view and in half sectional view in Fig. 6 upon a larger scale is mounted within the casing 79 surrounding the rotary shaft 82 and this combustion chamber differs in specific features somewhat from the combustion chamber shown in Fig. 2. The compressor casing 72 is provided with a radially outwardly directed flange 83 to which the double walled casing 79 is secured by the bolts 84. The bolts 84 also secure in position an annular flange member 85 having an arc shaped interior wall which directs the air coming from the compressor 73 from a radial direction to an axial direction into the passage 86 located between the inner surface of the casing 79 and the walls of the combustion chamber. The annular passage 106 extending both radially and axially and communicating with passage 86 is provided with a diffuser 87 for the compressed air.

The diffuser 75 is fixed to the casing 79 through the casing 78 for the turbine wheels and this diffuser is of the same construction as shown in Figs. 2 and 3. It is provided with blades 4a, see Fig. 3, and these blades are hollow. The blades 4a are held between two cylindrical coaxial walls 88 and 89 which are also fixed to the casing 79 through the casing 78. The hollow blades 4a define channels for the passage therethrough of compressed air through the openings 7, see Fig. 3, cut in the cylindrical surface 88 and the openings 8 cut in the inner wall 89 in the same manner as described above. The inlet of the outer wall 88 has a flange 90 which is bolted to the shell 91 by the bolts 92 and the shell 91 defines a portion of the combustion chamber.

The outlet end of the wall 88 is provided with a flange which is in turn secured to a flange provided upon the inlet end of the turbine casing 78 and such flanges are secured together by the bolts 93. A diffuser 94 is provided between the turbine wheels 80 and 81 and is provided with a labyrinthic sleeve 95 bearing upon the rotating hubs of the wheels 80 and 81. The inner wall 89 is provided with an inwardly radially directed flange 96 which is secured by the bolts 97 to the labyrinthic seal 98. At its inlet end the wall 89 is provided with a reinforcement 99 having a sliding contact surface 100 extending coaxially with the shaft 82.

The forward edge of the shell 91 is reinforced by a ring 101. Making sliding contact with such forward edge is an intermediate annular shell member 102 which has its rearward edge reinforced by the ring 103 at the point where the shell 102 makes sliding contact with the shell 91. A forward shell 104 extending radially inwardly, is flexibly connected to the shell 102 by means of the flexible clips 105.

Located in front of the shells 102 and 104 is the cover assembly comprising the plate 107 and the ring 108 secured to the plate 107 by the bolts 109 which also secure the diffuser 87 in place and define a portion of the inner surface of the annular passage 106.

The impeller 73 comprises the hub portion 110 which is secured to the hollow shaft 111 which in turn is fixed to the hollow shaft 82 and is of reduced diameter. The impeller 73 comprises the axially extending vanes 112 and the vanes 113 extending at first axially at the inlet side and then extending radially outwardly towards the passage 106. A further diffuser 114 is located in the axially extend portion of the passage 106.

In order to further support the intermediate shell 102 in position and allow for expansion and contraction thereof such shell is supported by the flexible brackets 115 to which it is secured by means of the bolts 116. The forward end of the flexible brackets is secured to the ring 108 by means of the bolts 109. Generally five of such brackets 115 disposed about the circumference of the shell 102 are sufficient.

The intermediate shell 102 is also provided with a series of cooling tubes 117 having their inlets adjacent the passage 86 and their outlets located substantially medially of the inner and outer annular walls of the outlet portion of the combustion chamber 74. Approximately twenty of such cooling tubes are located at spaced intervals around the circumference of the intermediate shell 102 although the number thereof may be increased or decreased as desired.

At the inner periphery of the shell 104 there is provided an axially extending flange 118 which is fixed in any desired manner to the labyrinthic ring 119 contacting an extension 122 provided upon the shaft 111. The flange 118 terminates with an edge 118'. The ring 119 is provided at its forward portion with a flange 120 secured fixedly to the cover plate 107 by the bolts 121. The labyrinthic ring 119 is also in contact with a ring 123 which is fixed to the shaft 111. The outer periphery of the ring 123 is located at the same distance from the center as the outer periphery of the rotating shaft 82. The ring 123 is provided with two radially spaced surfaces 124 and 125. Fixed to the inner periphery of the plate 107 is a ring 126 provided with two labyrinthic rings 127 and 128 which contact the surfaces 124 and 125 respectively of the ring 123.

The hollow shaft 111 is bolted to the hollow shaft 82 by means of the bolts 129 which extend through an outwardly directed flange upon the rear end of the shaft 111 and an inwardly directed flange upon the front end of the shaft 82. In between the flanges upon the shafts 111 and 82 there is clamped the slinger type fuel injector 130 which is also secured by means of the bolts 129. The slinger 130 is provided with the outlet bores 131 which are fed from the fuel line 132 feeding the passages 133 leading to the bores 131.

The wall of the casing 79 is shown as being provided with bleed apertures 134 and the power plant with an outer cover with a flanged air outlet 135 for adapting the plant for use as an air compressor.

Referring to Fig. 7 an elevational view of the shell 104 is shown therein. In said shell a series of tangential ports 136 are provided extending in three concentric circles 137, 138 and 139. The tangential ports 136 in the circle 137 are directed so as to open tangentially in a clockwise direction while the ports in the circle 138 open tangentially in counterclockwise direction. The ports in the circle 139 open in a clockwise direction. The ports in the front shell 104 are preset and are spaced radially thereof so as to make the temperature of the exhaust gases substantially uniform throughout the exhaust gas outlet. The center of the combustion flame in the combustion chamber 74 may be moved radially inwardly or outwardly by the presetting of the tangential ports 136. The arrangement also provides the requisite high turbulency. The slots in the outer perimeter of the shell 104 are to relieve stress and thereby prevent distortion of the wall.

In Fig. 8 an elevational view of the rear wall or shell 140 of the combustion chamber is shown which is provided with an axially extending flange 141 terminating with an edge 141' at its front end fixed to the labyrinthic ring 142 contacting the shaft 82. The edges 118' and 141' define therebetween an annular fuel inlet gap similar to that of Fig. 2. The slinger bores 131 may terminate short of the gap as shown for the slinger of Fig. 2, or they may extend into said gap as shown in Fig. 5.

The wall 140 extends radially outwardly from the ring 142 and is concave or dish-shaped towards the combustion space. It is then bent backwardly as shown particularly in Figs. 5 and 6 and extends radially inwardly at an inclination to form the portion 143 and is then again bent so as to extend axially at the portion 144. The rearward edge of the portion 144 is reinforced by a ring 145 where it slidingly contacts the contact surface 100 upon the reinforcement 99 of the inner wall 89 of the diffuser 75.

The concave or dish-shaped portion of the rear wall 140 is provided with a series of ports or apertures 146 as shown in Fig. 8 which may be of various sizes. The ports 146 as shown are arranged in four circles although this number of circles may be diminished or increased as desired. Also the apertures or ports 146 are formed in the rear wall 140 normal to the surface thereof so that air coming through said holes is focused to some extent or rather directed in a converging direction into the combustion space to supply the air to the flame core at the point of greatest combustion.

The surface 143 of the rear wall 140 is provided with apertures 147 at spaced intervals in a single line adjacent the most radial outward point of the wall and these apertures 147 are connected by slots 148 with certain apertures 146 provided upon the concave portion of the rear wall. Fixed to the rearward end of the labyrinthic ring 142 and to the front end of the labyrinthic ring 98 is a sleeve 149 which at its forward end has two rows of holes 150 of approximately sixteen holes each and which are disposed in staggered relation. At the rearward end of the sleeve 149 a single row of holes 151 is provided which are slightly larger in diameter than the forward holes. These holes are preferably sixteen in number.

An igniter 152 is mounted in the casing 79 and extends inwardly as shown in Figs. 5 and 6 to a point in front of the tangential ports provided in the front wall 104 of the combustion chamber so as to ignite and shoot a flame through such partition in order to ignite the combustible mixture in the combustion chamber. The igniter is connected to a separate fuel feed and carries a sparking device 153. The sparking device 153 is connected to an electrical ignition circuit. The igniter constitutes a unitary assembly which is located as above stated.

The entire assembly of the compressor, turbine and combustion chamber as outlined above lends itself extremely well to a streamlined construction and also results in an extremely compact compressor turbine.

The operation is as follows. Air coming from the annular inlet 76 is compressed by the impeller 73 and forced through the annular channel 106 into the annular channel 86. The impeller discharges radially outwardly through the diffuser 87 and then the air stream is turned 90° and discharges from the passage 106 into the channel 86 tangentially to the casing and flows initially axially through the annular space provided between the walls of the combustion chamber and the outer casing 79.

The stream of air is then divided into three parts with one part flowing axially inwardly between plate 107 and the intermediate shell 102 and the forward wall 104 of the combustion chamber. Such air flows through the tangential slots 136 provided in the forward wall 104 of the combustion chamber to the combustion space. A second stream of air constituting the primary air stream goes axially at first through the annular space 86 and then is curved in a loop as shown by the arrows in Fig. 5 inwardly around the wall 91 of the combustion space through the hollow blades of the diffuser 75 and then forwardly between the sleeve 149 and the portions 143 and 144 of the back wall 140 to the apertures 146 where it is directed inwardly into the combustion space. Then the air together with combustion products continue in a loop through the outlet portion and then axially into the turbine wheels and to the outlet of the engine. It will be noted that this stream of air goes axially at first and then is curved in a loop inwardly and directed axially in a reverse direction to the first direction and then makes a continuing loop through the combustion chamber, then through the burning mixture and continues through the outlet portion of the combustion chamber in a direction substantially parallel to the initial flow of air. All of this takes place smoothly and without any abrupt turns. The last named flow of burning mixture passes intermediate the hollow blades of the diffuser 75 and then impinges the blades of the turbine wheels. A third stream of air passes from the annular space 86 through the cooling tubes 117 to a point of the exhaust gas outlet which is closely adjacent the annular combustion chamber and the outlets of the cooling tubes are located at substantially the middle point between the inner and outer annular walls of such outlet portion.

Air is therefore supplied at all points where necessary to reduce the temperature of the burnt gases and also to maintain critical parts of the apparatus cooled while securing the greatest efficiency.

Fuel is injected into the combustion space by the slinger 130 through the ports 131.

It is also to be noted that with the general arrangement the exhaust gases from the combustion chamber are directed in a converging manner towards the turbine section and the same applies to the travel of the air streams and this converging arrangement is eminently satisfactory for the streamlining of the entire apparatus.

It is thought that the invention and its advantages will be understood from the foregoing description and it is apparent that various changes may be made in the process, form, construction and arrangement of the parts without departing from the spirit and scope of the invention or sacrificing its material advantages, the forms hereinbefore described and illustrated in the drawings being merely preferred embodiments thereof.

I claim:

1. A combustion apparatus, more particularly adapted to be inserted between a front impeller and a rear turbine, comprising a fixed outer casing, a fixed combustion chamber having an intake radial part acting simultaneously as combustion space and neighboring on said impeller, a medial axial part acting as mixing space and an axial outlet directed towards the turbine, said combustion chamber being housed within said casing and defining therewith an annular space surrounding said chamber and connected with the impeller, an axial rotating hollow member formed with radial passages opening into said combustion space, said hollow member being connected with a fuel feeding apparatus, means for dividing the flow of compressed air circulating through said annular space into three different streams, the first one penetrating axially within said combustion space near said radial passages at a speed less than that of said flow, the second one penetrating within said combustion space at a slight radial distance from said radial passages and being directed tangentially with respect to circles centered on said shaft, and the third one penetrating substantially radially within said mixing space, means for slightly braking the part of said compressed air flow forming said first stream and means for cooling the burnt gases escaping through said axial outlet.

2. A combustion apparatus, more particularly adapted to be inserted between a front impeller and a rear turbine, comprising a fixed outer casing, a fixed combustion chamber having an intake radial part acting simultaneously as combustion space and neighboring on said impeller, a medial axial part acting as mixing space and an axial outlet directed towards the turbine, said combustion chamber being housed within said casing and defining therewith an annular space surrounding said chamber and connected with the impeller, an axial rotating hollow member formed with radial passages opening into said combustion space, said hollow member being connected with a fuel feeding apparatus, means for dividing the flow of compressed air circulating through said annular space into three different streams, the first one penetrating axially within said combustion space near said radial passages at a speed less than that of said flow, the second one penetrating within said combustion space at a slight radial distance from said radial passages and being directed tangentially with respect to circles centered on said shaft in a direction opposed to the direction of rotation of said rotating member, and the third one penetrating substantially radially within said mixing space, means for slightly braking the part of said compressed air flow forming said first stream and means for cooling the burnt gases escaping through said axial outlet.

3. A combustion apparatus, more particularly adapted to be inserted between a front impeller and a rear turbine, comprising a fixed outer casing of revolution, a revoluble hollow shaft passing axially through said casing, a fixed combustion chamber housed within said casing, defining therewith an annular space connected with the impeller and including an inner wall of revolution coaxial with said shaft at a distance therefrom and held fast through its rear end, and two outer engaging walls also of revolution coaxial with said shaft and surrounding said inner wall, the rear outer wall being held fast through its rear end at a radial distance from said inner wall providing an annular outlet directed towards the turbine while the front outer wall is held fast through intermediary points, whereby said three walls may retract and expand freely, said three walls being shaped to provide in said chamber an intake radial part near the impeller which acts simultaneously as combustion space and an axial part near the turbine which acts as mixing space, a diffuser at the outlet of said chamber for diffusing the combustion gases, said hollow shaft being formed with radial perforations opening in said combustion space, means for feeding fuel through the perforations in said shaft into said combustion space, means for dividing the flow of compressed air circulating through said annular space into three different streams, the first one penetrating axially within said combustion space near said radial passages at a speed less than that of said flow, the second one penetrating within said combustion space at a slight radial distance from said radial passages and being directed tangentially with respect to circles centered on said shaft in a direction opposed to the direction of rotation of said rotating shaft, and the third one penetrating substantially radially within said mixing space, means for slightly braking the part of said compressed air flow forming said first stream and means for cooling the burnt gases escaping through said axial outlet.

4. A combustion apparatus, more particularly adapted to be inserted between a front impeller and a rear turbine, comprising a fixed outer casing of revolution, a revoluble hollow shaft passing axially through said casing, a fixed combustion chamber housed within said casing, defining therewith an annular space connected with the impeller and including an inner wall of revolution coaxial with said shaft at a distance therefrom and held fast through its rear end while defining an annular passage around said shaft at said rear end and a second annular passage of smaller dimensions at its front end, and two outer engaging walls also of revolution coaxial with said shaft and surrounding said inner wall, the rear outer wall being held fast through its inner end at a radial distance from the rear end of the inner wall for defining an annular outlet directed towards the turbine while the front outer wall is held fast through intermediary points and has an inner end defining with said shaft at a distance beyond said inner wall a third annular passage, said three walls defining in said chamber an intake radial zone limited by the front part of said inner wall and the inner part of said front outer wall and which acts as combustion space and an axial zone acting as mixing space; a diffuser connected with said annular outlet for diffusing the combustion gases to the turbine, said shaft being formed with radial perforations opening into said combustion space, means for feeding fuel through the perforations in said shaft into said combustion space, means for dividing the flow of compressed air circulating through said annular space into three different streams, the first one penetrating axially within said combustion space through said second and third passages at a speed less than that of said flow, the second one penetrating within said combustion space at a slight radial distance from said radial passages and being directed tangentially with respect to circles centered on said shaft in a direction opposed to the direction of rotation of said rotating shaft, and the third one penetrating substantially radially within said mixing space, and means for cooling the burnt gases escaping through said axial outlet.

5. A combustion apparatus, according to claim 4, wherein the means for generating the first stream of compressed air comprises a wall to the front of the combustion chamber defining in the annular space with the outer surface of said chamber a passage guiding the compressed air into the combustion space through the third annular passage, and a hollow blade diffuser connected with the annular outlet for diffusing the combustion gases to the turbine, the hollow blades of said diffuser opening in said annular space and discharging compressed air into said combustion space through said first and second annular passages.

6. A combustion apparatus, according to claim 4, wherein the front portion of the inner wall and the inner portion of the front outer wall are symmetrically diverging from the shaft and formed with radial openings, and wherein the means for generating the second stream of compressed air comprises a wall to the front of the combustion chamber connected at its inner part with the inner section of the front outer wall for defining in the annular space with the outer surface of said chamber a closed passage guiding the compressed air into the combustion space through the radial openings formed in said front outer wall, a second inner wall located between the revoluble shaft and the inner wall, merging with the front end of said inner wall around the second annular passage and dividing the first annular passage into two concentric annular passages, means for supporting said second inner wall on said revoluble shaft while managing therewith a small clearance, a hollow blade diffuser connected with the annular outlet for diffusing the combustion gases to the turbine, the hollow blades of said diffuser opening in said annular space and discharging compressed air into said combustion space through said divided annular passage and through the radial openings formed in the front portion of said inner wall.

7. A combustion apparatus, according to claim 6, wherein the radial openings in the inner portion of the front outer wall and the front portion of the inner wall are formed with fins projecting within the combustion space, said fins being directed in a direction opposed to the direction of rotation of the revoluble shaft.

8. A combustion apparatus, according to claim 4, wherein the front portion of the inner wall and the inner portion of the front outer wall are symmetrically diverging from the shaft and formed with radial openings, and wherein the means for generating the first and second streams of compressed air comprise a second front wall to the front of the combustion chamber formed with a hub portion surrounding the hollow perforated shaft at a radial distance therefrom, said hub portion having radial perforations, a perforated labyrinthic member mounted with a small clearance round said revoluble shaft and inserted in said hub portion, an intermediary wall located between said second front wall and the front outer surface of the combustion chamber and connected at its inner part with the inner section of the front outer wall, said second front and intermediary walls respectively defining in the annular space, on the one hand, with the outer surface of said intermediary wall a passage guiding the compressed air into the combustion space through said radial perforations, said labyrinthic member and the third annular passage, and, on the other hand, with the outer surface of said chamber a closed passage guiding the compressed air into the combustion space through the radial openings formed in the front outer wall, a second inner wall located between the revoluble shaft and the inner wall, merging with the front end of said inner wall around the second annular passage and dividing the first annular passage into two concentric annular passages, a second perforated labyrinthic member mounted with a small clearance round the revoluble shaft and inserted in the inner portion of said divided passage between said shaft and the rear part of said second inner wall, a hollow blade diffuser connected with the annular outlet for diffusing the combustion gases to the turbine, the hollow blades of said diffuser opening in said annular space and discharging compressed air into said combustion space, on one hand, through said second labyrinthic member and the second annular passage and, on the second hand, through the outer portion of said divided annular passage and through the radial openings formed in the front portion of said inner wall.

9. A combustion apparatus, according to claim 8, wherein sump-shaped members are provided passing through the outer casing, the second front and intermediary walls and the front outer wall of the combustion chamber, whereby said second front and intermediary walls and said front outer wall are held fast, and ignition plugs fitted in said members slightly beyond and at a small distance from the inflow of the fuel.

10. A combustion apparatus, according to claim 4, wherein the front portion of the inner wall and the inner portion of the front outer wall are symmetrically diverging from the shaft and formed with radial openings, the diverging portion of said inner wall merging in a cylindrical portion rearwardly directed, wherein the rear outer wall ends forwardly with a truncated conical section directed towards the shaft and formed with equally distributed longitudinal slots registering with the cylindrical section of said inner wall, whereby a part of the compressed air circulating through the annular space penetrates substantially axially within the mixing space limited by said cylindrical and frustoconical sections, and wherein the means for generating the first and second streams of compressed air comprise a second front wall to the front of the combustion chamber formed with a hub portion surrounding the hollow perforated shaft at a radial distance therefrom, said hub portion having radial perforations, a perforated labyrinthic member mounted with a small clearance round said revoluble shaft and inserted in said hub portion, an intermediary wall located between said second front wall and the front outer surface of the combustion chamber and connected at its inner part with the inner section of the front outer wall, said second front and intermediary walls radially merging the front end of said truncated conical section and respectively defining in the annular space, on the one hand, with the outer surface of said intermediary wall a passage guiding the compressed air into the combustion space through said radial perforations, said labyrinthic member and the third annular passage, and, on the other hand, with the outer surface of said chamber a closed passage guiding the compressed air into the combustion space through the radial openings formed in the front outer wall, a second inner wall located between the revoluble shaft and the inner wall, merging with the front end of said inner wall around the second annular passage and dividing the first annular passage into two concentric annular passages, a second perforated labyrinthic member mounted with a small clearance round the revoluble shaft and inserted in the inner portion of said divided passage between said shaft and the rear part of said second inner wall, and a hollow blade diffuser connected with the annular outlet for diffusing the combustion gases to the turbine, the hollow blades of said diffuser opening in said annular space and discharging compressed air into said combustion space, on one hand, through said second labyrinthic member and the second annular passage and, on the other hand, through the outer portion of said divided annular passage and through the radial openings formed in the front portion of said inner wall.

11. A combustion apparatus, according to claim 4, wherein the means for feeding fuel through the perforations in the shaft comprises a member located in said hollow shaft and formed with a corrugated conical fuel guiding channel opening into the radial perforations formed through the shaft, and means for adjusting the amount of fuel before it enters said channel, the perforations having diameters which are larger than that required for the admission of the necessary amount of fuel.

12. A combustion apparatus, more particularly adapted to be inserted in alignment between a front impeller and a rear tubine, comprising a revoluble hollow shaft, a fixed combustion chamber including an inner and an outer wall of revolution defining a front inner end of annular form followed by an axially disposed annular passage coaxial with said shaft and constructed to expand and retract freely, said hollow shaft being formed with radial perforations opening into the front inner end of said chamber, means for feeding fuel through said perforations into said combustion chamber, means for igniting the fuel in the air in said combustion chamber, means for producing a stream of primary compressed air at low speed penetrating into the same part of the chamber as the fuel, means for producing a secondary stream of compressed air opening beyond the opening of the fuel and primary air feeding means into the chamber, means for feeding a third stream of air into the annular passage of the chamber, the secondary and third streams having speeds higher than that of said primary stream, a diffuser at the rear end of the chamber and having an annular series of radial hollow blades defining therebetween an outlet to the turbine, and means whereby parts of the primary and secondary streams of compressed air pass through said hollow blades of said diffuser.

13. A combustion apparatus, more particularly adpted to be inserted between a front impeller and a rear turbine, comprising a fixed outer casing of revolution, a revoluble hollow shaft passing axially through said casing, a fixed combustion chamber housed within said casing, defining therewith an annular space connected with the impeller and including an inner and an outer wall of revolution coaxial with said shaft, both of said walls being constructed to expand and retract freely, the outer wall being provided with a plurality of ports in its medial portion, said hollow shaft being formed with radial perforations opening into the end of said chamber neighboring on said impeller, means for feeding fuel through said perforations into said combustion chamber, means for igniting the fuel in the air in said combustion chamber, a diffuser at the outlet formed between the rear ends of the two walls, a first wall located between the revoluble shaft and the inner wall, a pair of successive walls to the front of the outer wall, and means whereby compressed air is delivered from said annular space in three streams, the first one passing between the walls forming the pair and around the revoluble shaft for penetrating into the front part of said chamber, the second one passing around the front and rear portions of the outer wall and between the inner wall and the first wall for penetrating into the front part of the combustion chamber, and the third one passing through the ports formed in the medial part of the outer wall and axially through the diffuser.

14. A combustion apparatus, more particularly adapted to be inserted in alignment between a front impeller type air compressor having an inlet and an outlet and a rear turbine, comprising a fixed outer casing, a toroidal combustion chamber having a front, an outer and an inner wall defining an annular radially extending primary combustion portion having radially extending front and rear walls and an uninterruptedly annular secondary combustion portion longitudinally extending towards the turbine, said combustion chamber being housed within said casing and defining therewith an annular space surrounding said chamber communicating with said compressor outlet, means for supplying fuel to said combustion chamber and comprising rotary fuel injecting means constructed to spray the fuel radially outwardly into said primary combustion portion substantially medially of said front and rear walls in a plane extending substantially normal to the axis of the combustion chamber, means for dividing the flow of compressed air through said annular space from said compressor into a plurality of different streams, one of said streams being directed to flow radially inwardly exteriorly of said front wall, another of said streams being directed against said rear wall, said front and rear walls each being provided with a plurality of ports through which said streams of air are injected in substantially opposed directions into said annular primary combustion portion for mixing with the fuel supplied thereto by said fuel supplying means, another of said streams being radially inwardly injected into said longitudinally extending secondary combustion portion substantially at the inlet thereof through ports provided on the outerwall for crossing the burning mixture coming from said annular primary combustion portion and cooling the exhaust gases.

15. A combustion apparatus, more particularly adapted to be inserted in alignment between a front impeller type air compressor having an inlet and an outlet and a rear turbine, comprising a fixed outer casing, a toroidal combustion chamber having a front, an outer and an inner wall defining an annular radially extending primary combustion portion having radially extending front and rear walls and an uninterruptedly annular secondary combustion portion longitudinally extending towards the turbine, said combustion chamber being housed within said casing and defining therewith an annular space surrounding said chamber communicating with said compressor outlet, said front wall comprising relatively movable inner and outer shells, flexible means connecting said inner and outer shells, flexible brackets interconnecting said casing and said outer shell, means for supplying fuel to said combustion chamber and comprising fuel injection means constructed to spray the fuel radially outwardly into said primary combustion portion substantially medially of said front and rear walls in a plane extending substantially normal to the axis of the combustion chamber, means for dividing the flow of compressed air through said annular space from said compressor into a plurality of different streams, one of said streams being directed to flow radially inwardly exteriorly of said front wall, another of said streams being directed against said rear wall, said front and rear walls each being provided with a plurality of ports through which said streams of air are injected in substantially opposed directions into said annular primary combustion portion for mixing with the fuel supplied thereto by said fuel supplying means, another of said streams being radially inwardly injected into said longitudinally extending secondary combustion portion substantially at the inlet thereof through ports provided on the outer wall for crossing the burning mixture coming from said annular primary combustion portion and cooling the exhaust gases.

16. A combustion apparatus more particularly adapted to be inserted in alignment between a front air compressor having an inlet and an outlet and a rear turbine, comprising a fixed outer casing, an annular combustion chamber having front and rear radially extending walls defining an annular primary portion and an outer and inner axially extending wall defining an annular secondary portion longitudinally extending towards the turbine, said front wall having openings therein, said combustion chamber being housed within said casing and defining therewith an annular space surrounding said chamber communicating with said compressor outlet, said primary portion of said combustion chamber including operating fuel supply means comprising the combustion space in which combustion is first initiated, said outlet portion of said combustion chamber communicating with the outlet portion of said primary combustion space and extending longitudinally rearwardly towards the rear turbine, said outer casing providing an air passage leading radially inwardly to said front wall of said primary portion and an igniter comprising a starting fuel feed and sparking device carried as an assembly and disposed within the air stream outside of the combustion chamber being fed to said openings in said front wall and located adjacent thereto, said device being connected to a suitable source of current and fuel supply.

17. A combustion apparatus adapted to support combustion by means of a fast moving gas flow, comprising means for supplying the gas flow, a fixed outer casing having an inlet means, means for affording ingress of the gas flow thereinto, a fixed annular combustion chamber having a radially inwardly extending part acting as a primary combustion space and neighboring on said inlet means, a medial axial part connected to the outer portion of said primary combustion space and acting as a secondary combustion space and an annular axially extending outlet portion, said combustion chamber being located within said casing and defining therewith an annular space surrounding said chamber and connected with the gas flow source through said inlet means, an axial hollow rotary member formed with radial passages opening into said primary combustion space, said hollow member being associated with a fuel feeding apparatus, means for dividing the gas flow circulating through said annular space into three different streams, the first one penetrating axially within said primary combustion space near said radial passages at a speed less than that of said initial gas flow, the second one penetrating within said primary combustion space at a slight radial distance from said radial passages and being directed tangentially with respect to circles centered on said member, and the third one penetrating substantially radially within said secondary combustion space and means for slightly braking the part of said gas flow forming said first stream.

18. A combustion apparatus adapted to support combustion by means of a fast moving gas flow, comprising means for supplying the gas flow, a fixed outer casing having an inlet means, means for affording ingress of the gas flow thereinto, a fixed annular combustion chamber having a radially inwardly extending part acting as a primary combustion space and neighboring on said inlet means, a medial axial part connected to the outer portion of said primary combustion space and acting as a secondary combustion space and openly connected with an annular axially extending outlet portion, said combustion chamber being located within said casing and defining therewith an annular space surrounding said chamber and connected with the gas flow source through said inlet means, an axial hollow rotary member formed with radial passages opening into said primary combustion space, said hollow member being associated with a fuel feeding apparatus, means for dividing the gas flow circulating through said annular space into three different streams, the first one penetrating axially within said primary combustion space near said radial passages at a speed less than that of said initial gas flow, the second one penetrating within said primary combustion space at a slight radial distance from said radial passages and being directed tangentially with respect to circles centered on said member, and the third one penetrating substantially radially within said secondary combustion space.

19. A combustion apparatus adapted to support combustion by means of a fast moving gas flow, comprising means for supplying the gas flow, a fixed outer casing having an inlet means, means for affording ingress of the gas flow thereinto, a fixed annular combustion chamber having a radially inwardly extending part acting as a primary combustion space and neighboring on said inlet means, a medial axial part connected to the outer portion of said primary combustion space and acting as a secondary combustion space and openly connected with an annular axially extending outlet portion, said combustion chamber being located within said casing and defining therewith an annular space surrounding said chamber and connected with the gas flow source through said inlet means, an axial hollow rotary member formed with radial passages opening into said primary combustion space, said hollow member being associated with a fuel feeding apparatus, means for dividing the gas flow circulating through said annular space into three different streams, the first one penetrating axially within said primary combustion space near said radial passages at a speed less than that of said initial gas flow, the second one penetrating within said primary combustion space at a slight radial distance from said radial passages and being directed tangentially with respect to circles centered on said member, and the third one penetrating substantially radially within said secondary combustion space, a labyrinthic seal surrounding said hollow member forwardly of said radial passages therein, and means for dividing said first stream to provide air through said seal to the space between said seal and said hollow member.

20. In an internal combustion turbine engine, an air compressor, a turbine, a shaft drivingly connecting said turbine and compressor, a toroidal combustion chamber having walls of revolution about the said shaft axis and defining a radially extending primary combustion space having an annular fuel inlet opening about said shaft and a longitudinally extending secondary combustion space terminating in an outlet, said walls comprising a front wall, an outer wall, an end rear wall and an inner wall, said inner wall having a portion re-entrant into the combustion chamber and defining a rear wall of said primary combustion space, said front and rear walls provided with air inlet openings, said end rear wall defining said outlet, a casing surrounding said combustion chamber to provide an annular air chamber connected with the air compressor outlet and supplied with air under pressure from said air compressor, means dividing said compressed air into multiple streams and conducting same to said combustion spaces, one stream being conducted from said annular air chamber to said front wall and introduced through the front wall openings into the primary combustion space, a second stream being conducted from said annular air chamber around said rear end wall to said rear wall and introduced through the rear wall openings into the primary combustion space in a direction substantially opposed to the direction of flow of said first stream, and a third stream introduced radially inwardly from said annular air chamber into said secondary combustion space, a source of fuel supply, and a rotating fuel slinger connected with said source of fuel supply and constructed to centrifugally introduce the fuel substantially radially outwardly through said annular fuel inlet openings of said primary combustion space intermediate said first and second air streams in a plane substantially normal to the shaft axis.

21. An internal combustion turbine engine as in claim 20, wherein the openings in said front wall of the primary combustion space are provided with louvers acting on said air flow to direct same into said toroidal primary combustion space substantially tangentially to a circle centered on said shaft axis in a plane normal thereto.

22. An internal combustion turbine engine as in claim 20, wherein said secondary space outlet comprises a hollow bladed nozzle, and means directing said second stream of air radially inwardly through said hollow blades of said nozzle toward the shaft axis and thence forwardly to the rear wall of said primary combustion space.

23. An internal combustion turbine engine as in claim 20, wherein said fuel slinger is secured to said shaft and comprises an outer peripheral portion projecting into said annular fuel inlet opening of said primary combustion space and in which said openings in the front and rear walls of said primary combustion space are radially outwardly spaced from the fuel inlet opening aforesaid.

24. An internal combustion turbine engine as in claim 20, wherein the rear wall of said primary combustion space is of a concave configuration towards said combustion space, and in which the openings in said rear wall are radially spaced, whereby to introduce the air into said primary combustion space in a converging direction.

25. In an internal combustion turbine engine including a power shaft, and impeller and turbine wheels mounted on the shaft, a fixed annular combustion chamber having walls of revolution bounding a primary combustion zone extending radially of the shaft from an adjacent point to a remote point and a secondary combustion zone extending axially of the shaft from the remote point toward the turbine wheel, said walls also defining at said adjacent point an annular fuel inlet gap facing toward the shaft, and rotary means for centrifugally introducing fuel into the primary combustion zone through said gap and spraying it in a direction substantially normal to said shaft axis, the walls bounding said primary combustion zone having air inlet openings through which compressed air delivered by said impeller wheel is respectively introduced in opposed directions toward the fuel.

References Cited in the file of this patent

UNITED STATES PATENTS

| | | |
|---|---|---|
| 2,244,467 | Lysholm | June 3, 1941 |
| 2,256,198 | Hahn | Sept. 16, 1941 |
| 2,360,130 | Heppner | Oct. 10, 1944 |
| 2,398,654 | Lubbock et al. | Apr. 16, 1946 |
| 2,445,114 | Halford | July 13, 1948 |
| 2,525,207 | Clarke et al. | Oct. 10, 1950 |
| 2,538,179 | Weinhardt | Jan. 16, 1951 |
| 2,586,751 | Watson et al. | Feb. 10, 1952 |
| 2,607,193 | Berggren et al. | Aug. 19, 1952 |
| 2,620,626 | Lysholm | Dec. 9, 1952 |
| 2,631,429 | Jacklin | Mar. 17, 1953 |
| 2,648,951 | McDougal | Aug. 18, 1953 |

FOREIGN PATENTS

| | | |
|---|---|---|
| 585,343 | Great Britain | Feb. 5, 1947 |

UNITED STATES PATENT OFFICE
CERTIFICATE OF CORRECTION

Patent No. 2,856,755                                                           October 21, 1958

Joseph Szydlowski

It is hereby certified that error appears in the above numbered patent requiring correction and that the said Letters Patent should read as corrected below.

In the heading to the printed specification, between lines 5 and 6, insert — Claims priority, application France November 30, 1948 —.

Signed and sealed this 21st day of July 1959.

(SEAL)
Attest:
KARL H. AXLINE

Attesting Officer

ROBERT C. WATSON
Commissioner of Patents